(12) United States Patent
Kartashov et al.

(10) Patent No.: US 10,809,797 B1
(45) Date of Patent: Oct. 20, 2020

(54) CALIBRATION OF MULTIPLE SENSOR MODULES RELATED TO AN ORIENTATION OF A USER OF THE SENSOR MODULES

(71) Applicant: Finch Technologies Ltd., Fish Bay, Tortola (VG)

(72) Inventors: Alexey Ivanovich Kartashov, Moscow (RU); Viktor Vladimirovich Erivantcev, Ufa (RU); Alexander Sergeevich Lobanov, Ufa (RU); Iakov Evgenevich Sergeev, Ufa (RU); Daniil Olegovich Goncharov, Ufa (RU); Roman Tagirovich Karimov, Ufa (RU)

(73) Assignee: Finch Technologies Ltd., Fish Bay, Tortola (VG)

( * ) Notice: Subject to any disclaimer, the term of this patent is extended or adjusted under 35 U.S.C. 154(b) by 0 days.

(21) Appl. No.: 16/534,674

(22) Filed: Aug. 7, 2019

(51) Int. Cl.
*G06F 3/01* (2006.01)

(52) U.S. Cl.
CPC ............. *G06F 3/011* (2013.01); *G06F 3/017* (2013.01)

(58) Field of Classification Search
CPC .............................................. G06F 3/011–014
See application file for complete search history.

(56) References Cited

U.S. PATENT DOCUMENTS

| | | | |
|---|---|---|---|
| 7,426,878 B2 * | 9/2008 | Lian | A63B 69/20 463/36 |
| 8,933,886 B2 | 1/2015 | Imoto et al. | |
| 8,988,438 B2 | 3/2015 | Bang et al. | |
| 9,141,194 B1 | 9/2015 | Keyes et al. | |
| 9,413,376 B2 * | 8/2016 | Lowe | H03M 7/3082 |

(Continued)

FOREIGN PATENT DOCUMENTS

| | | |
|---|---|---|
| CN | 103226398 | 7/2013 |
| WO | 2016209819 | 12/2016 |

OTHER PUBLICATIONS

Capacitive sensing, Wikipedia, printed on Dec. 10, 2018.

(Continued)

*Primary Examiner* — Gene W Lee
(74) *Attorney, Agent, or Firm* — Greenberg Traurig

(57) ABSTRACT

A system including a computing device receiving a first indication, the first indication indicating that a plurality of sensor modules are positioned in placeholders in a container device, wherein the placeholders are configured to hold the plurality of sensor modules at pre-determined positions and orientations in the container device. In response to the first indication, the computing device calibrates orientation measurements of the plurality or sensor modules relative to a first common reference system based on the pre-determined positions and orientations in the container device. The computing device then receives a second indication, the second indication indicating that the sensor modules are positioned on parts of a user; and in response to the second indication, the computing device calibrates the plurality of sensor modules relative to user's reference system aligned with the orientation of the user based on a specific orientation relation between the arm sensor module and the orientation of the user, wherein the arm sensor module is one of the plurality of sensor modules.

20 Claims, 6 Drawing Sheets

(56) References Cited

U.S. PATENT DOCUMENTS

| | | | |
|---|---|---|---|
| D772,986 S | 11/2016 | Chen et al. | |
| 9,504,414 B2 | 11/2016 | Coza et al. | |
| 9,600,925 B2 | 3/2017 | Katz et al. | |
| 9,958,942 B2* | 5/2018 | Asplund | G06F 3/014 |
| 9,996,945 B1 | 6/2018 | Holzer et al. | |
| 10,019,806 B2 | 7/2018 | Perry et al. | |
| 10,281,982 B2* | 5/2019 | Keller | G06F 3/016 |
| 10,488,916 B2* | 11/2019 | Hahami | A61B 5/6805 |
| 10,521,011 B2 | 12/2019 | Erivantcev et al. | |
| 10,540,006 B2 | 1/2020 | Erivantcev et al. | |
| 10,560,113 B2* | 2/2020 | Lowe | G01D 5/241 |
| 2006/0166620 A1* | 7/2006 | Sorensen | G06F 3/017 455/41.1 |
| 2007/0050597 A1 | 3/2007 | Ikeda | |
| 2007/0273610 A1 | 11/2007 | Baillot | |
| 2008/0262772 A1 | 10/2008 | Luinge et al. | |
| 2009/0322763 A1 | 12/2009 | Bang et al. | |
| 2010/0079466 A1 | 4/2010 | Griffin | |
| 2012/0025945 A1 | 2/2012 | Yazadi et al. | |
| 2014/0028547 A1 | 1/2014 | Bromley et al. | |
| 2014/0232418 A1 | 8/2014 | Heim et al. | |
| 2014/0313022 A1 | 10/2014 | Moeller et al. | |
| 2015/0145860 A1 | 5/2015 | Craig et al. | |
| 2015/0145985 A1 | 5/2015 | Gourlay et al. | |
| 2015/0213653 A1 | 7/2015 | Kord | |
| 2015/0277559 A1 | 10/2015 | Vescovi et al. | |
| 2015/0358543 A1 | 12/2015 | Kord | |
| 2016/0005232 A1 | 1/2016 | Quarles | |
| 2016/0187969 A1 | 6/2016 | Larsen et al. | |
| 2016/0378204 A1 | 12/2016 | Chen et al. | |
| 2017/0053454 A1 | 2/2017 | Katz et al. | |
| 2017/0083084 A1 | 3/2017 | Tatsuta et al. | |
| 2017/0115728 A1 | 4/2017 | Park et al. | |
| 2017/0262059 A1* | 9/2017 | Lund | G06F 3/014 |
| 2017/0308165 A1 | 10/2017 | Erivantcev et al. | |
| 2017/0347885 A1 | 12/2017 | Tan et al. | |
| 2018/0095637 A1 | 4/2018 | Valdivia et al. | |
| 2018/0101989 A1 | 4/2018 | Frueh et al. | |
| 2018/0165879 A1 | 6/2018 | Holzer et al. | |
| 2018/0217680 A1 | 8/2018 | Sudou et al. | |
| 2018/0225517 A1 | 8/2018 | Holzer et al. | |
| 2018/0253142 A1 | 9/2018 | Tsuchie et al. | |
| 2018/0313867 A1 | 11/2018 | Erivantcev et al. | |
| 2018/0330521 A1 | 11/2018 | Samples et al. | |
| 2018/0335834 A1 | 11/2018 | Erivantcev et al. | |
| 2018/0335855 A1 | 11/2018 | Erivantcev et al. | |
| 2019/0187784 A1 | 6/2019 | Erivantcev et al. | |
| 2019/0212359 A1 | 7/2019 | Erivantcev et al. | |
| 2019/0236344 A1 | 8/2019 | Chen et al. | |
| 2019/0250708 A1* | 8/2019 | Gupta | G06F 3/017 |
| 2020/0033937 A1* | 1/2020 | Erivantcev | G06F 3/014 |

OTHER PUBLICATIONS

IQS263B ProxSense IC, http://www.azoteq.com/2017-02-09-07-38-01/proxsense/11-products/151-iqs263.html, printed on Dec. 10, 2018.

Title: Calibration of Inertial Measurement Units Attached to Arms of a User to Generate Inputs for Computer Systems, U.S. Appl. No. 15/817,646, filed Nov. 20, 2017, Inventor(s): Viktor Erivantcev, et al, Status: Docketed New Case—Ready for Examination, Status Date: Jan. 10, 2018.

Title: Tracking Torso Orientation to Generate Inputs for Computer Systems, U.S. Appl. No. 15/813,813, filed Nov. 15, 2017, Inventor(s): Viktor Erivantcev, et al, Status: Docketed New Case—Ready for Examination, Status Date: Jan. 17, 2018.

Title: Calibration of Inertial Measurement Units Attached to Arms of a User and to a head Mounted Device, U.S. Appl. No. 15/847,669, filed Dec. 19, 2017, Inventor(s): Viktor Erivantcev, et al, Status: Non Final Action Mailed, dated Apr. 8, 2019.

Title: Correction of Accumulated Errors in Inertial Measurement Units Attached to a User, U.S. Appl. No. 15/868,745, filed Jan. 11, 2018, Inventor(s): Viktor Erivantcev, et al, Status: Docketed New Case—Ready for Examination, Status Date: Mar. 2, 2018.

Title: Universal Handheld Controller of a Computer System, U.S. Appl. No. 16/229,940, filed Dec. 21, 2018, Inventor(s): Viktor Erivantcev, et al, Status: Docketed New Case—Ready for Examination, Status Date: Feb. 26, 2019.

* cited by examiner

CALIBRATION OF MULTIPLE SENSOR MODULES RELATED TO AN ORIENTATION OF A USER OF THE SENSOR MODULES

RELATED APPLICATIONS

The present application relates to U.S. patent application Ser. No. 15/817,646, filed Nov. 20, 2017 and entitled "Calibration of inertial measurement units attached to arms of a user to generate inputs for computer systems", which claims the benefit of the filing date of Prov. U.S. Pat. App. Ser. No. 62/491,909, filed Apr. 28, 2017. The present application relates to U.S. patent application Ser. No. 15/813,813, filed Nov. 15, 2017 and entitled "Tracking Torso Orientation to Generate Inputs for Computer Systems", which claims the benefit of the filing date of Prov. U.S. Pat. App. Ser. No. 62/507,090, filed May 16, 2017. The present application also relates to U.S. patent application Ser. No. 15/792,255, filed Oct. 24, 2017 and entitled "Tracking Finger Movements to Generate Inputs for Computer Systems", and U.S. patent application Ser. No. 15/787,555, filed Oct. 18, 2017 and entitled "Tracking Arm Movements to Generate Inputs for Computer Systems", both claim the benefit of the filing date of Prov. U.S. Pat. App. Ser. No. 62/507,085, filed May 16, 2017. The present application also relates to U.S. patent application Ser. No. 15/492,915, filed Apr. 20, 2017 and entitled "Devices for Controlling Computers based on Motions and Positions of Hands", which claims the benefit of the filing dates of 62/325,925, filed Apr. 21, 2016 and entitled "Hand-Worn Devices for Controlling Computers based on Motions and Positions of Hands and Fingers", Prov. U.S. Pat. App. Ser. No. 62/463,183, filed Feb. 24, 2017 and entitled "Devices for Controlling Computers based on Motions and Positions of Hands and Arms," Prov. U.S. Pat. App. Ser. No. 62/463,209, filed Feb. 24, 2017 and entitled "Devices for Controlling Computers based on Motions and Positions of Hands," Prov. U.S. Pat. App. Ser. No. 62/463,252, filed Feb. 24, 2017 and entitled "Devices for Controlling Computers based on Motions and Positions of Hands and Arms." The entire disclosures of the above-referenced related applications are hereby incorporated herein by reference.

FIELD OF THE TECHNOLOGY

The embodiments disclosed herein relate to computer input devices in general and more particularly but not limited to calibrate devices for virtual reality and/or augmented/mixed reality applications implemented using computing devices, such as mobile phones, smart watches, similar mobile devices, and/or other devices.

BACKGROUND

U.S. Pat. App. Pub. No. 2014/0028547 discloses a user control device having a combined inertial sensor to detect the movements of the device for pointing and selecting within a real or virtual three-dimensional space.

U.S. Pat. App. Pub. No. 2015/0277559 discloses a finger-ring-mounted touchscreen having a wireless transceiver that wirelessly transmits commands generated from events on the touchscreen.

U.S. Pat. App. Pub. No. 2015/0358543 discloses a motion capture device that has a plurality of inertial measurement units to measure the motion parameters of fingers and a palm of a user.

U.S. Pat. App. Pub. No. 2007/0050597 discloses a game controller having an acceleration sensor and a gyro sensor. U.S. Pat. No. D772,986 discloses the ornamental design for a wireless game controller.

Chinese Pat. App. Pub. No. 103226398 discloses data gloves that use micro-inertial sensor network technologies, where each micro-inertial sensor is an attitude and heading reference system, having a tri-axial micro-electromechanical system (MEMS) micro-gyroscope, a tri-axial micro-acceleration sensor and a tri-axial geomagnetic sensor which are packaged in a circuit board. U.S. Pat. App. Pub. No. 2014/0313022 and U.S. Pat. App. Pub. No. 2012/0025945 disclose other data gloves.

The disclosures of the above discussed patent documents are hereby incorporated herein by reference.

BRIEF DESCRIPTION OF THE DRAWINGS

The embodiments are illustrated by way of example and not limitation in the figures of the accompanying drawings in which like references indicate similar elements.

DETAILED DESCRIPTION

The following description and drawings are illustrative and are not to be construed as limiting. Numerous specific details are described to provide a thorough understanding. However, in certain instances, well known or conventional details are not described in order to avoid obscuring the description. References to one or an embodiment in the present disclosure are not necessarily references to the same embodiment; and, such references mean at least one.

At least some embodiments disclosed herein related to a problem regarding the alignment of the measurements made via IMUs embedded in different modules. Each IMU has a gyro sensor (gyroscope) that measures the angular velocity. From an initial orientation, the integration of angular velocity over time provides the subsequent orientations. The goal of calibration is to set an initial point where the reference systems of the initial orientations are aligned with each other such that the subsequent orientation measurements are relative to the same reference system. Further, when the modules are worn on the body of the user, it is preferred to align the reference systems of the IMUs with the reference system of the user (e.g., left to right, back to front, and down to up). Also, in some embodiments, devices are "universal" in the sense that there is no inherent "left" or "right", or "up" or "down". Any of the two handheld devices can be in the left hand. Any of the arm module can be in the right arm. An arm module can be worn up-side-up, or up-side-down. So, the calibration process also determines how the modules are worn on the user. U.S. patent application Ser. No. 15/817, 646 has a technique to tell which handheld controller is in which hand. This can be used here in the calibration.

The sensor modules can include inertial measurement units (IMUs) attached to hands, arms and/or the head of the user. The IMUs can generate measurements to determine the orientations of the hands, upper arms, upper arms, and/or the head of the user.

Figure 1:
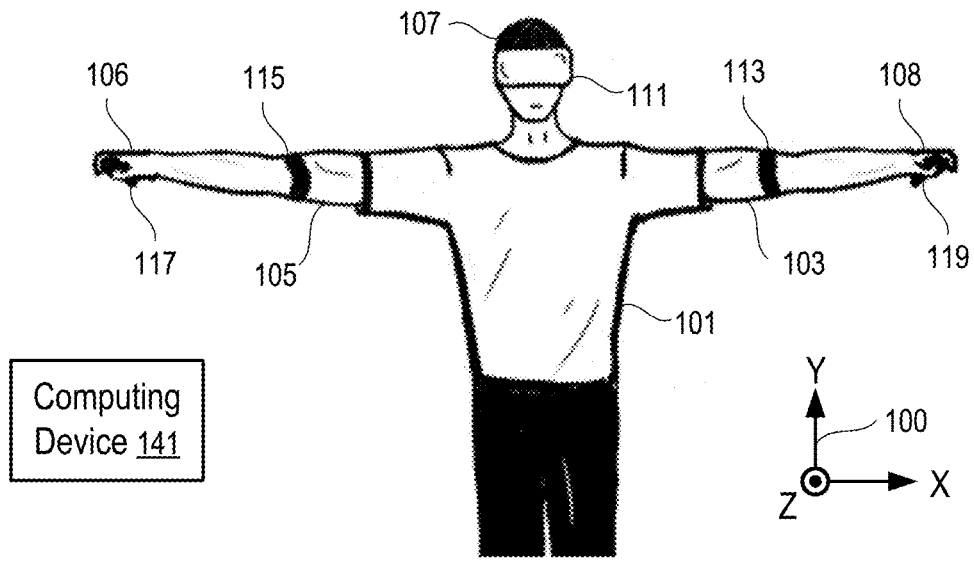
FIG. 1 illustrates a calibration system according to one embodiment.

FIG. 1 illustrates a calibration system according to one embodiment.

In FIG. 1, a user wears a number of sensor devices or modules (111, 113, 115, 117 and 119) that track the orientations of portions of the user, such as the head (107), the upper arms (103 and 105), and the hands (106 and 108).

The sensor devices (111-119) communicate their movement measurements to a computing device (141). In some implementations, each of the sensor devices (111-119) communicates its measurements directly to the computing device (141) in a way independent from the operations of other sensor devices.

Alternative, one of the sensor devices (111-119) can function as a base unit that receives measurements from one or more other sensor devices and transmit the bundled and/or combined measurements to the computing device (141).

Preferably, wireless connections made via a personal area wireless network (e.g., Bluetooth connections), or a local area wireless network (e.g., Wi-Fi connections) are used to facilitate the communication from the sensor devices (111-119) to the computing device (141).

Alternatively, wired connections can be used to facilitate the communication among some of the sensor devices (111-119) and/or with the computing device (141).

For example, a hand module (117 or 119) attached to or held in a corresponding hand (106 or 108) of the user can receive the motion measurements of a corresponding arm module (115 or 113) and transmit the motion measurements of the corresponding hand (106 or 108) and the corresponding upper arm (105 or 103) to the computing device (141). Further, the hand module (e.g., 117) can combine its measurements with the measurements of the corresponding arm module (115) to compute the orientation of the forearm connected between the hand (106) and the upper arm (105), in a way as disclosed in U.S. patent application Ser. No. 15/787,555, filed Oct. 18, 2017, entitled "Tracking Arm Movements to Generate Inputs for Computer Systems" and published as U.S. Pat. App. Pub. No. 2018/0335855, the entire disclosure of which is hereby incorporated herein by reference.

For example, the hand modules (117 and 119) and the arm modules (115 and 113) can be each respectively implemented via a base unit (or a game controller) and an arm/shoulder module discussed in U.S. patent application Ser. No. 15/492,915, filed Apr. 20, 2017, entitled "Devices for Controlling Computers based on Motions and Positions of Hands" and published as U.S. Pat. App. Pub. No. 2017/0308165, the entire disclosure of which is hereby incorporated herein by reference.

In some implementations, the head module (111) is configured as a base unit that receives the motion measurements from the hand modules (117 and 119) and the arm modules (115 and 113) and bundles the measurement data for transmission to the computing device (141). In some instances, the computing device (141) is implemented as part of the head module (111).

In a calibration process, the orientation measurements of the sensor modules (111 to 119) are calibrated relative to a common reference system, such as the coordinate system XYZ (100) aligned with an orientation of the user. For example, the X and Z axes are in the horizontal plane in FIG. 1; the Y axis is in the vertical direction; the Z axis is aligned with the front facing direction of the user; and the X axis is aligned with a direction from the left to the right of the user.

Figure 3:
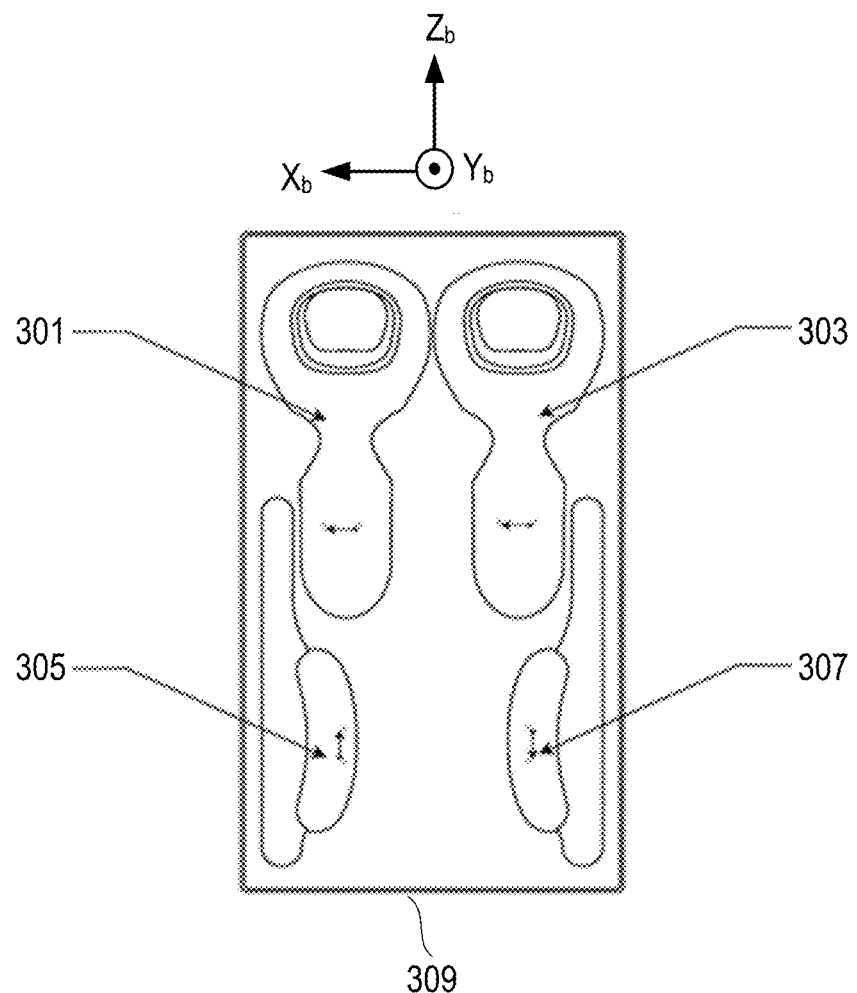
FIG. 3 illustrates initial positions and orientations for each module in a charging case according to one embodiment illustrated in FIG. 1.
Figure 4:
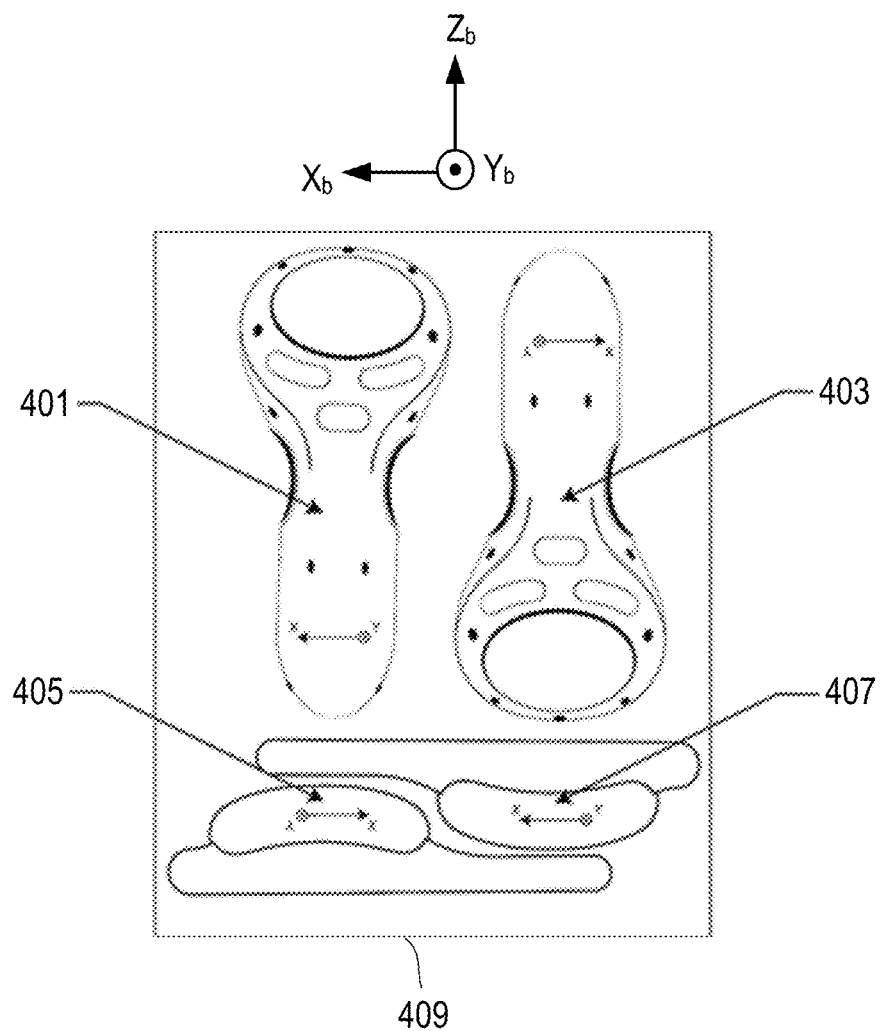
FIG. 4 illustrates initial positions and orientations for each module in a charging case according to one embodiment illustrated in FIG. 1.

In at least some embodiments, the orientation measurements of the sensor modules (e.g., 111 to 119) are first calibrated relative to a fixture, such as a container device, where the sensor modules (e.g., 111 to 119) have predetermined orientations relative to each other. When the sensor modules (e.g., 111 to 119) are worn on the user, the sensor modules (e.g., 111 to 119) are further calibrated relative to the user (e.g., coordinate system 1000). For example, the container device can be a cradle-charging case, or another setup, where when the sensor modules (e.g., 113 to 119) are placed in the designed placeholders for the modules, the sensor modules (e.g., 113 to 119) have pre-determined orientations relative to each other (e.g., as illustrated in FIG. 3 and FIG. 4). Based on the pre-determined orientations imposed on the sensor modules (e.g., 113 to 119) when the modules (113, 115, 117, and/or 119) are in the container device, the orientation measurements of the sensor modules (e.g., 113 to 119) can be calibrated relative to a common reference system relative to the container device. The sensor modules are configured to continue tracking their orientations after being calibrated related to the container device. After the sensor modules are removed from the container device and worn on the user, the rotation from the reference system relative to the container to the reference system (e.g., 100) relative to the user can be determined (e.g., as discussed in connection with FIG. 5). Using the rotation, the orientation measurements of the sensor modules (e.g., 113 to 119) can be further calibrated relative to a common reference system (e.g., 100) relative to the user.

Once the orientation measurements have been calibrated, the sensor modules (111 to 119) can be configured to store their last orientations before shutting down or activating of sleep-mode. When the system is turned on again or wakes up from the sleep-mode, the stored last orientations of the IMU modules can be used as the initial orientations of IMU modules for the next use of devices. In some implementations, after shutting down of the sensor modules, the system can determine that user doesn't move any module and last orientation of devices didn't change. For example, the system can determine the initial orientation by determining user stops using IMU modules and puts all modules on some surface, or that modules have activated sleep-mode. By collecting last orientation data for each module, the system can use data of modules orientations relative to each other at next device activating.

Figure 2:
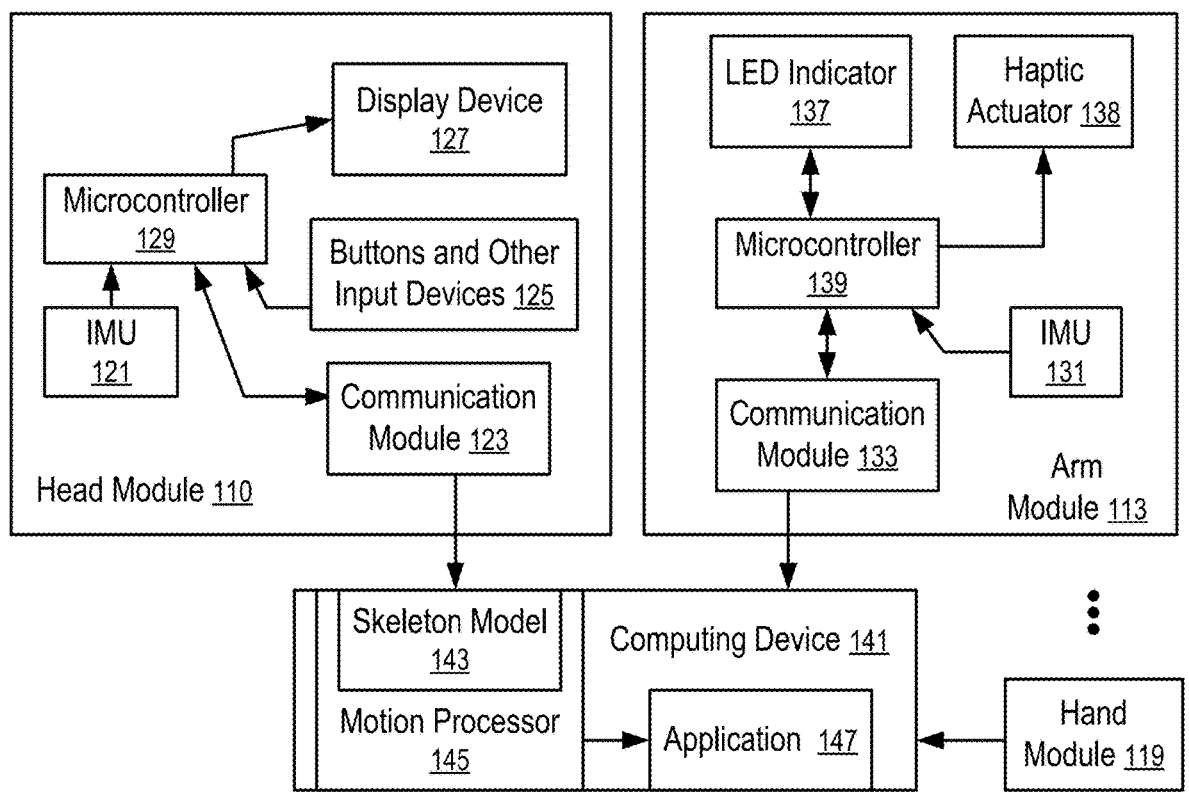
FIG. 2 illustrates a system to control computer operations according to one embodiment.

FIG. 2 illustrates a system to control computer operations according to one embodiment. For example, the system of FIG. 2 can be implemented via attaching the arm modules (115, 113) to the upper arms (105 and 103) respectively and optionally, the head module (111) to the head (107), in a way illustrated in FIG. 1.

In FIG. 2, the head module (111) and the arm module (113) have micro-electromechanical system (MEMS) inertial measurement units (IMUs) (121 and 131) that measure motion parameters and determine orientations of the head (107) and the upper arm (103). Similarly, the hand module (119) can also have its IMU. The positions of various points can be calculated from the combinations of the orientations and the lengths, such as the positions of the hands and joints. The positions can be used to generate gesture inputs.

Each of the IMUs (131, 121) has a collection of sensor components that enable the determination of the movement, position and/or orientation of the respective IMU along a number of axes. Examples of the components are: a MEMS accelerometer that measures the projection of acceleration (the difference between the true acceleration of an object and the gravitational acceleration); a MEMS gyroscope that measures angular velocities; and a magnetometer that measures the magnitude and direction of a magnetic field at a certain point in space. In some embodiments, the IMUs use a combination of sensors in three and two axes (e.g., without a magnetometer).

The computing device (141) has a motion processor (145), which includes a skeleton model (143) of the user. The motion processor (145) controls the movements of the corresponding parts of the skeleton model (143) according to the movements/orientations of the upper arms (103 and 105) measured by the arm modules (113 and 115), the movements/orientation of the head (107) measured by the head module (111), the movements/orientations of the hand (106 and 108) measured by the hand modules (117 and 119), etc.

The skeleton model (143) is controlled by the motion processor (145) to generate inputs for an application (147) running in the computing device (141). For example, the skeleton model (143) can be used to control the movement of an avatar/model of the arms (105 and 103), the hands (106 and 108), the head (107), and the torso (101) of the user of the computing device (141) in a video game, a virtual reality, a mixed reality, or augmented reality, etc.

Preferably, the arm module (113) has a microcontroller (139) to process the sensor signals from the IMU (131) of the arm module (113) and a communication module (133) to transmit the motion/orientation parameters of the arm module (113) to the computing device (141). Similarly, the head module (111) has a microcontroller (129) to process the sensor signals from the IMU (121) of the head module (111) and a communication module (123) to transmit the motion/orientation parameters of the head module (111) to the computing device (141).

Optionally, the arm module (113) and the head module (111) have LED indicators (137 and 127) respectively to indicate the operating status of the modules (113 and 111).

Optionally, the arm module (113) has a haptic actuator (138) respectively to provide haptic feedback to the user.

Optionally, the head module (111) has a display device (127) and/or buttons and other input devices (125), such as a touch sensor, a microphone, a camera, etc.

In some implementations, the head module (111) is replaced with a module that is similar to the arm module (113) and that is attached to the head (107) via a strap or is secured to a head mount display device.

In some applications, the hand module (119) can be implemented with a module that is similar to the arm module (113) and attached to the hand via holding or via a strap. Optionally, the hand module (119) has buttons and other input devices, such as a touch sensor, a joystick, etc.

For example, the handheld modules disclosed in U.S. patent application Ser. No. 15/792,255, filed Oct. 24, 2017, entitled "Tracking Finger Movements to Generate Inputs for Computer Systems" and published as U.S. Pat. App. Pub. No. 2018/0335843, U.S. patent application Ser. No. 15/787,555, filed Oct. 18, 2017, entitled "Tracking Arm Movements to Generate Inputs for Computer Systems" and published as U.S. Pat. App. Pub. No. 2018-0335855, and/or U.S. patent application Ser. No. 15/492,915, filed Apr. 20, 2017, entitled "Devices for Controlling Computers based on Motions and Positions of Hands" and published as U.S. Pat. App. Pub. No. 2017-0308165 can be used to implement the hand modules (117 and 119), the entire disclosures of which applications are hereby incorporated herein by reference.

FIG. 2 shows a hand module (119) and an arm module (113) as examples. An application for the tracking of the orientation of the torso (101) typically uses at least two arm modules (113 and 115) illustrated in FIG. 1, as further disclosed in U.S. Pat. App. Pub. No. 2018/0335834, entitled "Tracking Torso Orientation to Generate Inputs for Computer Systems", the entire disclosure of which is hereby incorporated herein by reference. Hand modules (117 and 119) can be further used to provide additional inputs and/or for the prediction/calculation of the orientations of the forearms of the user.

Typically, an IMU (e.g., 131 or 121) in a module (e.g., 113 or 111) generates acceleration data from accelerometers, angular velocity data from gyrometers/gyroscopes, and/or orientation data from magnetometers. The microcontrollers (139 and 129) perform preprocessing tasks, such as filtering the sensor data (e.g., blocking sensors that are not used in a specific application), applying calibration data (e.g., to correct the average accumulated error computed by the computing device (141)), transforming motion/position/orientation data in three axes into a quaternion, and packaging the preprocessed results into data packets (e.g., using a data compression technique) for transmitting to the host computing device (141) with a reduced bandwidth requirement and/or communication time.

Each of the microcontrollers (129, 139) can include a memory storing instructions controlling the operations of the respective microcontroller (129 or 139) to perform primary processing of the sensor data from the IMU (121, 131) and control the operations of the communication module (123, 133), and/or other components, such as the LED indicator (137), the haptic actuator (138), buttons and other input devices (125), the display device (127), etc.

The computing device (141) can include one or more microprocessors and a memory storing instructions to implement the motion processor (145). The motion processor (145) can also be implemented via hardware, such as Application-Specific Integrated Circuit (ASIC) or Field-Programmable Gate Array (FPGA).

In some instances, one of the modules (111, 113, 115, 117, and/or 119) is configured as a primary input device; and the other module is configured as a secondary input device that is connected to the computing device (141) via the primary input device. A secondary input device can use the microprocessor of its connected primary input device to perform some of the preprocessing tasks. A module that communicates directly to the computing device (141) is consider a primary input device, even when the module does not have a secondary input device that is connected to the computing device via the primary input device.

In some instances, the computing device (141) specifies the types of input data requested, and the conditions and/or frequency of the input data; and the modules (111, 113, 115, 117, and/or 119) report the requested input data under the conditions and/or according to the frequency specified by the computing device (141). Different reporting frequencies can be specified for different types of input data (e.g., accelerometer measurements, gyroscope/gyrometer measurements, magnetometer measurements, position, orientation, velocity).

In general, the computing device (141) can be a data processing system, such as a mobile phone, a desktop computer, a laptop computer, a head mount virtual reality display, a personal medial player, a tablet computer, etc.

FIG. 3 shows initial positions and orientations for each module in a charging case according to one embodiment illustrated in FIG. 1. In particular, FIG. 3 shows the configuration of a fixture (e.g., a charging box) with initial positions of modules (301, 303, 305, 307) in a charging case (309). With placeholders configured in the charging case 9309), the orientations of the modules (301, 303, 305, 307) relative to each other are substantially fixed.

The module may include handheld controller (301, 303), armband module (305, 307), wearable device such as rings, gloves, watches, and trackers. In FIG. 3, using known initial orientation of IMU modules relative to each other for X and Y axles, the system can calibrate the skeletal model of the user direct from device activating.

In some implementations, if the box and/or the module contains electronic contact point, the surface profile for holding the device can be used configured such that a module does not sit properly when the orientation is incorrect or off.

In some implementations, the box, case, or board can be implemented as a charging module too. For example, system can receive information direct from module that charging status was updated. Then system can receive and save last data about orientation of module for X and Y axles, and those data can be used as initial orientation of each module relative to each other for next time of module's using.

In FIG. 3, each IMU module (e.g., hand modules 301 and 303, arm modules 305 and 307) is configured in one position relative to each other in a case or a box (309) and the orientations of the modules relative to each other are substantially fixed. The last orientation data in X and Y axles is received from each module (301, 303, 305 and 307) for further calibration process without user interaction. The arrangement (quantity of modules, locations and angles between each module) in the box or the case is illustrated in FIG. 3.

FIG. 4 shows initial positions and orientations for each module in a charging case according to one embodiment illustrated in FIG. 1. In particular, FIG. 4 shows the configuration of a fixture (e.g., a charging box) with initial positions of modules (401, 403, 405, 407) in a charging case (409). With placeholders configured in the charging case 9309), the orientations of the modules (401, 403, 405, 407) relative to each other are substantially fixed.

The module may include handheld controller (401, 403), armband module (405, 407), wearable device such as rings, gloves, watches, and trackers. In FIG. 4, using known initial orientation of IMU modules relative to each other for X and Y axles, the system can calibrate the skeletal model of the user direct from device activating.

In FIG. 4, each IMU module (e.g., hand modules 401 and 403, arm modules 405 and 407) is configured in one position relative to each other in a case or a box (409) and the orientations of the modules relative to each other are substantially fixed. The last orientation data in X and Y axles is received from each module (401, 403, 405 and 407) for further calibration process without user interaction. The arrangement (quantity of modules, locations and angles between each module) in the box or the case is illustrated in FIG. 4.

Figure 5:
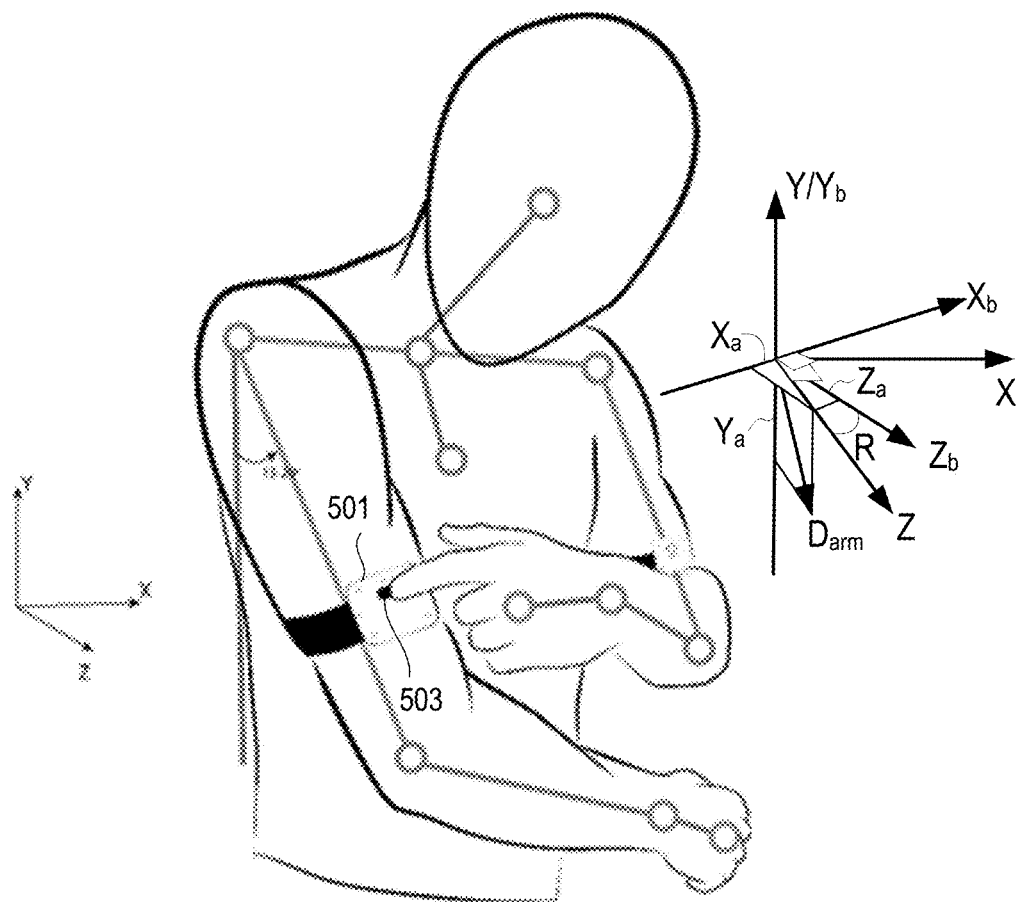
FIG. 5 shows a method to calibrate the modules relative to a coordinate system that is defined by the user orientation according to one embodiment.

FIG. 5 illustrates a way to calibrate the modules relative to a coordinate system that is defined by the user orientation. The diagram of FIG. 5 illustrates that after at least some of the sensor modules are worn on a user, the user pushes a button (503) on an arm module (501). In response, the sensor modules are calibrated relative to the user based on the assumed relation of the arm direction as measured by the arm module, relative to the body of the user, as further discussed below.

In FIG. 5, coordinate system $X_b Y_b Z_b$ represents the common coordinate system relative to a container device (e.g., the box's orientation illustrated in FIG. 3 or FIG. 4); coordinate system XYZ is aligned with the user when the user pressing the button on an arm module (501, such as module 113 or 115 illustrated in FIGS. 1 and/or 2, or module 305 or 307 in FIG. 3, or module 305 or 307 in FIG. 4). As illustrated in FIG. 5, when the button on the arm module (501), the direction $D_{arm}$ of the arm of the user as measured by the arm module (501) that is considered to be in the YZ plane. The direction $D_{arm}$ of the arm as measured by the arm module (501) can be projected in the reference system $X_b Y_b Z_b$ according to the directions of the axes $X_b$, $Y_b$, $Z_b$ to obtain components $X_a$, $Y_a$, and $Z_a$, where $X_a$ is the projection of $D_{arm}$ along the axis $X_b$, $Y_a$ is the projection of $D_{arm}$ along the axis $Y_b$, and $Z_a$ is the projection of $D_{arm}$ along the axis $Z_b$. the projections (e.g., $X_a$ and $Z_a$) can be used calculate the rotation angle R from the coordinate system $X_b Y_b Z_b$ to the coordinate system XYZ along the horizontal axis $Y/Y_b$ such that the calibration relative to the coordinate system $X_b Y_b Z_b$ can be converted to the calibration relative to the coordinate system XYZ. For example, R can be calculated from the relation $\tan R = X_a/Z_a$. In other implementations, the assumption that the direction $D_{arm}$ is in the YZ plane is not used; and the orientation of $D_{arm}$ relative to the XYZ system at the time of user pressing the button 503 can be estimated (e.g., from a statistical analysis, or a machine learning technique). The estimated orientation relation of $D_{arm}$ in the XYZ system can be used to calculate the rotation R between the XYZ system and the $X_b Y_b Z_b$ system such that the orientation measurements of the sensor modules are calibrated related to the user (e.g., the XYZ system).

Figure 6:
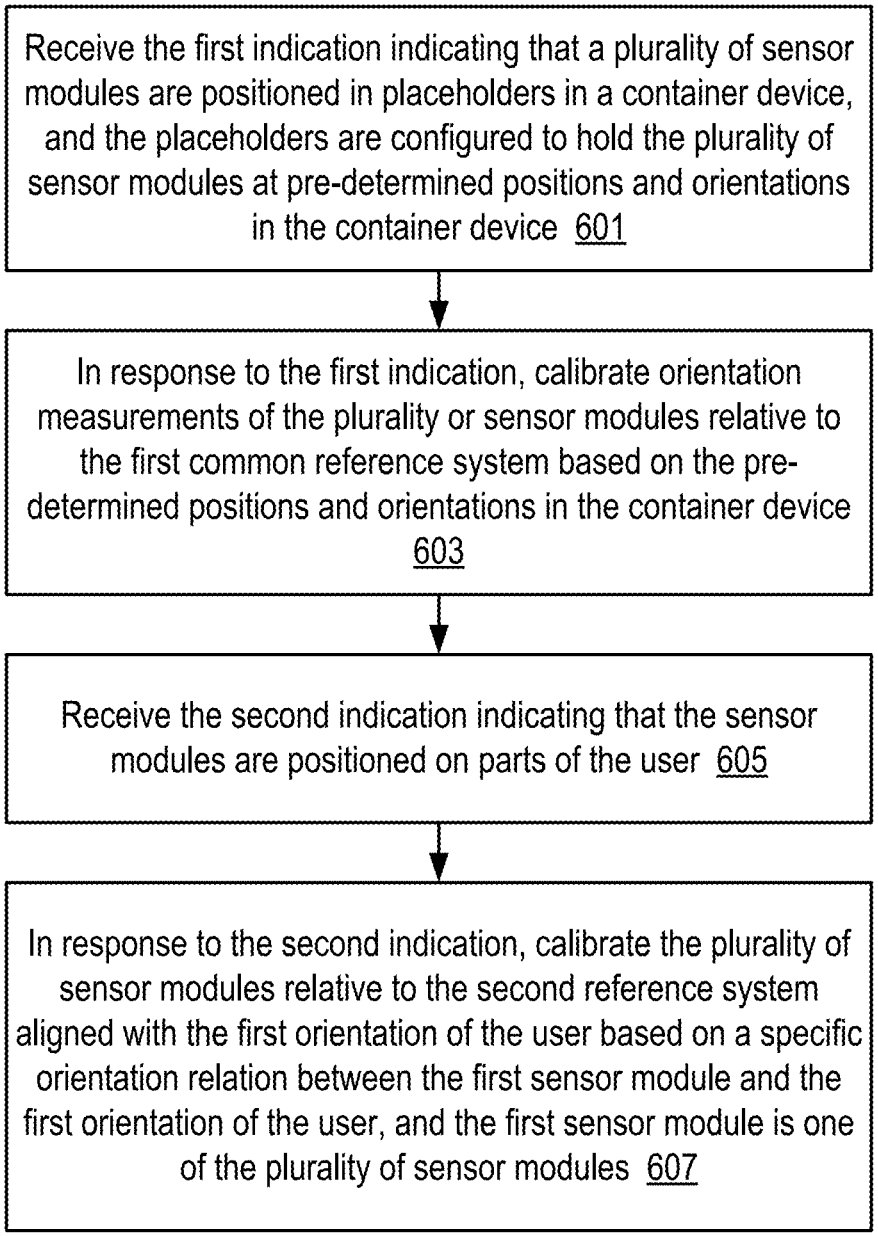
FIG. 6 illustrates a diagram that can be used to perform a calibration process according to one embodiment.

In FIG. 6, a computing device (141): receives (601) the first indication indicating that a plurality of sensor modules (e.g., handheld modules (117 and 119), arm modules (113 and 115)) are positioned in placeholders in a container device (e.g., illustrated in FIGS. 3 and 4), and the placeholders are configured to hold the plurality of sensor modules (301, 303, 305, 307, 401, 403, 405, and 407) at pre-determined positions and orientations in the container device (309 and 409); In response to the first indication, calibrates (603) orientation measurements of the plurality or sensor modules (301, 303, 305, 307, 401, 403, 405, and 407) relative to the first common reference system based on the pre-determined positions and orientations in the container device (309, 409); receives (605) the second indication indicating that the sensor modules (301, 303, 305, 307, 401, 403, 405, and 407) are positioned on parts of the user; In response to the second indication, calibrates (607) the plurality of sensor modules (301, 303, 305, 307, 401, 403, 405, and 407) relative to the second reference system aligned with the first orientation of the user based on a specific orientation relation between the first sensor module (305, 307, 405, or 407) and the first orientation of the user (e.g., illustrated in FIG. 5), and the first sensor module (305, 307, 405, 407) is one of the plurality of sensor modules (301, 303, 305, 307, 401, 403, 405, and 407). For example, IMU's sensor modules are calibrated relative to each other based on their fixed, predetermined orientations in a box that is placed in a horizontal surface. After the sensor modules are worn on a user, the user pushes a button on an arm module (e.g., illustrated in FIG. 5). In response, the sensor modules are calibrated relative to the user based on the assumed relation of the arm direction as measured by the arm module, relative to the body of the user.

The present disclosure includes methods and apparatuses which perform these methods, including data processing systems which perform these methods, and computer readable media containing instructions which when executed on data processing systems cause the systems to perform these methods.

For example, the computing device (141), the arm module (113) and/or the handheld module (115) can be implemented using one or more data processing systems.

A typical data processing system can include includes an inter-connect (e.g., bus and system core logic), which interconnects a microprocessor(s) and memory. The microprocessor is typically coupled to cache memory.

The inter-connect interconnects the microprocessor(s) and the memory together and also interconnects them to input/output (I/O) device(s) via I/O controller(s). I/O devices can include a display device and/or peripheral devices, such as mice, keyboards, modems, network interfaces, printers, scanners, video cameras and other devices known in the art. In one embodiment, when the data processing system is a server system, some of the I/O devices, such as printers, scanners, mice, and/or keyboards, are optional.

The inter-connect can include one or more buses connected to one another through various bridges, controllers and/or adapters. In one embodiment the I/O controllers include a USB (Universal Serial Bus) adapter for controlling USB peripherals, and/or an IEEE-1394 bus adapter for controlling IEEE-1394 peripherals.

The memory can include one or more of: ROM (Read Only Memory), volatile RAM (Random Access Memory), and non-volatile memory, such as hard drive, flash memory, etc.

Volatile RAM is typically implemented as dynamic RAM (DRAM) which requires power continually in order to refresh or maintain the data in the memory. Non-volatile memory is typically a magnetic hard drive, a magnetic optical drive, an optical drive (e.g., a DVD RAM), or other type of memory system which maintains data even after power is removed from the system. The non-volatile memory can also be a random access memory.

The non-volatile memory can be a local device coupled directly to the rest of the components in the data processing system. A non-volatile memory that is remote from the system, such as a network storage device coupled to the data processing system through a network interface such as a modem or Ethernet interface, can also be used.

In the present disclosure, some functions and operations are described as being performed by or caused by software code to simplify description. However, such expressions are also used to specify that the functions result from execution of the code/instructions by a processor, such as a microprocessor.

Alternatively, or in combination, the functions and operations as described here can be implemented using special purpose circuitry, with or without software instructions, such as using Application-Specific Integrated Circuit (ASIC) or Field-Programmable Gate Array (FPGA). Embodiments can be implemented using hardwired circuitry without software instructions, or in combination with software instructions. Thus, the techniques are limited neither to any specific combination of hardware circuitry and software, nor to any particular source for the instructions executed by the data processing system.

While one embodiment can be implemented in fully functioning computers and computer systems, various embodiments are capable of being distributed as a computing product in a variety of forms and are capable of being applied regardless of the particular type of machine or computer-readable media used to actually effect the distribution.

At least some aspects disclosed can be embodied, at least in part, in software. That is, the techniques can be carried out in a computer system or other data processing system in response to its processor, such as a microprocessor, executing sequences of instructions contained in a memory, such as ROM, volatile RAM, non-volatile memory, cache or a remote storage device.

Routines executed to implement the embodiments can be implemented as part of an operating system or a specific application, component, program, object, module or sequence of instructions referred to as "computer programs." The computer programs typically include one or more instructions set at various times in various memory and storage devices in a computer, and that, when read and executed by one or more processors in a computer, cause the computer to perform operations necessary to execute elements involving the various aspects.

A machine readable medium can be used to store software and data which when executed by a data processing system causes the system to perform various methods. The executable software and data can be stored in various places including for example ROM, volatile RAM, non-volatile memory and/or cache. Portions of this software and/or data can be stored in any one of these storage devices. Further, the data and instructions can be obtained from centralized servers or peer to peer networks. Different portions of the data and instructions can be obtained from different centralized servers and/or peer to peer networks at different times and in different communication sessions or in a same communication session. The data and instructions can be obtained in entirety prior to the execution of the applications. Alternatively, portions of the data and instructions can be obtained dynamically, just in time, when needed for execution. Thus, it is not required that the data and instructions be on a machine readable medium in entirety at a particular instance of time.

Examples of computer-readable media include but are not limited to non-transitory, recordable and non-recordable type media such as volatile and non-volatile memory devices, read only memory (ROM), random access memory (RAM), flash memory devices, floppy and other removable disks, magnetic disk storage media, optical storage media (e.g., Compact Disk Read-Only Memory (CD ROM), Digital Versatile Disks (DVDs), etc.), among others. The computer-readable media can store the instructions.

The instructions can also be embodied in digital and analog communication links for electrical, optical, acoustical or other forms of propagated signals, such as carrier waves, infrared signals, digital signals, etc. However, propagated signals, such as carrier waves, infrared signals, digital signals, etc. are not tangible machine readable medium and are not configured to store instructions.

In general, a machine readable medium includes any mechanism that provides (i.e., stores and/or transmits) information in a form accessible by a machine (e.g., a computer, network device, personal digital assistant, manufacturing tool, any device with a set of one or more processors, etc.).

In various embodiments, hardwired circuitry can be used in combination with software instructions to implement the techniques. Thus, the techniques are neither limited to any specific combination of hardware circuitry and software nor to any particular source for the instructions executed by the data processing system.

In the foregoing specification, the disclosure has been described with reference to specific exemplary embodiments thereof. It will be evident that various modifications can be made thereto without departing from the broader spirit and scope as set forth in the following claims. The specification and drawings are, accordingly, to be regarded in an illustrative sense rather than a restrictive sense.

What is claimed is:

1. A method, comprising:
receiving, by a computing device, a first indication, the first indication indicating that a plurality of sensor modules are positioned in placeholders in a container device, wherein the placeholders are configured to hold the plurality of sensor modules at pre-determined positions and orientations in the container device;
in response to the first indication, calibrating, by the computing device, orientation measurements of the plurality or sensor modules relative to a first common reference system based on the pre-determined positions and orientations in the container device;
receiving, by the computing device, a second indication, the second indication indicating that the sensor modules are positioned on parts of a user; and
in response to the second indication, calibrating, by the computing device, the plurality of sensor modules relative to a second reference system aligned with a first orientation of the user based on a specific orientation relation between a first sensor module and the first orientation of the user, wherein the first sensor module is one of the plurality of sensor modules.

2. The method of claim 1, wherein the container device is a charging device.

3. The method of claim 2, wherein each respective sensor module has an inertial measurement unit (IMU) configured to measure an orientation of the respective sensor module.

4. The method of claim 3, wherein the first indication is generated in response to a determination that the sensor modules are connected to the charging device for charging.

5. The method of claim 4, wherein the first indication is generated in response to the passing of a predetermined amount of time from a previous calibration operation in the container device while the sensor modules are connected in the container device.

6. The method of claim 2, wherein the first indication is generated in response to a determination that a cover of the container device is open while the sensor modules are electronically connected to the charging device.

7. The method of claim 1, wherein the second indication is generated in response to an activation of a button on an arm module; and wherein the sensor modules include the arm module configured to be positioned on an upper arm of the user.

8. The method of claim 7, wherein each respective sensor module has an inertial measurement unit (IMU) having a micro-electromechanical system (MEMS) gyroscope configured to measure an orientation of a respective sensor module.

9. The method of claim 8, wherein the IMU further includes a magnetometer.

10. The method of claim 8, wherein the IMU further includes a MEMS accelerometer.

11. A system, comprising:
one or more processors; and
a non-transitory computer-readable medium including one or more sequences of instructions that, when executed by the one or more processors, causes:
receiving, by a computing device, a first indication, the first indication indicating that a plurality of sensor modules are positioned in placeholders in a container device, wherein the placeholders are configured to hold the plurality of sensor modules at pre-determined positions and orientations in the container device;
in response to the first indication, calibrating, by the computing device, orientation measurements of the plurality or sensor modules relative to a first common reference system based on the pre-determined positions and orientations in the container device;
receiving, by the computing device, a second indication, the second indication indicating that the sensor modules are positioned on parts of a user; and
in response to the second indication, calibrating, by the computing device, the plurality of sensor modules relative to a second reference system aligned with a first orientation of the user based on a specific orientation relation between a first sensor module and the first orientation of the user, wherein the first sensor module is one of the plurality of sensor modules.

12. The system of claim 11, wherein the container device is a charging device.

13. The system of claim 12, wherein each respective sensor module has an inertial measurement unit (IMU) configured to measure an orientation of the respective sensor module.

14. The system of claim 13, wherein the first indication is generated in response to a determination that the sensor modules are connected to the charging device for charging.

15. The system of claim 14, wherein the first indication is generated in response to the passing of a predetermined amount of time from a previous calibration operation in the container device while the sensor modules are connected in the container device.

16. The system of claim 12, wherein the first indication is generated in response to a determination that a cover of the container device is open while the sensor modules are electronically connected to the charging device.

17. The system of claim 11, wherein the second indication is generated in response to an activation of a button on an arm module; and wherein the sensor modules include the arm module configured to be positioned on an upper arm of the user.

18. The system of claim 17, wherein each respective sensor module has an inertial measurement unit (IMU) having a micro-electromechanical system (MEMS) gyroscope configured to measure an orientation of a respective sensor module.

19. The system of claim 18, wherein the IMU further includes a magnetometer and a MEMS accelerometer.

20. A non-transitory computer storage medium storing instructions which, when executed by a computing device, instructs the computing device to perform a method, the method comprising:
receiving, by the computing device, a first indication, the first indication indicating that a plurality of sensor modules are positioned in placeholders in a container device, wherein the placeholders are configured to hold the plurality of sensor modules at pre-determined positions and orientations in the container device;
in response to the first indication, calibrating, by the computing device, orientation measurements of the plurality or sensor modules relative to a first common reference system based on the pre-determined positions and orientations in the container device;

receiving, by the computing device, a second indication, the second indication indicating that the sensor modules are positioned on parts of a user; and in response to the second indication, calibrating, by the computing device, the plurality of sensor modules relative to a second reference system aligned with a first orientation of the user based on a specific orientation relation between a first sensor module and the first orientation of the user, wherein the first sensor module is one of the plurality of sensor modules.

\* \* \* \* \*